(12) United States Patent
Andersson et al.

(10) Patent No.: US 9,447,804 B2
(45) Date of Patent: Sep. 20, 2016

(54) FURNITURE JOINT

(71) Applicant: Inter IKEA Systems B.V., Delft (NL)

(72) Inventors: Benny Andersson, Älmhult (SE);
Göran Sjöstedt, Älmhult (SE); Anders Eriksson, Älmhult (SE)

(73) Assignee: INTER IKEA SYSTEMS B.V. (NL)

(\*) Notice: Subject to any disclaimer, the term of this patent is extended or adjusted under 35 U.S.C. 154(b) by 0 days.

(21) Appl. No.: 14/225,289

(22) Filed: Mar. 25, 2014

(65) Prior Publication Data

US 2014/0205373 A1 Jul. 24, 2014

Related U.S. Application Data

(63) Continuation-in-part of application No. PCT/EP2012/050469, filed on Jan. 13, 2012.

(51) Int. Cl.
*F16B 12/00* (2006.01)
*F16B 12/12* (2006.01)
*F16B 12/22* (2006.01)
*F16B 12/46* (2006.01)
*A47B 96/06* (2006.01)
*A47B 47/04* (2006.01)

(52) U.S. Cl.
CPC .......... *F16B 12/125* (2013.01); *F16B 12/22* (2013.01); *F16B 12/46* (2013.01); *A47B 47/042* (2013.01); *A47B 96/066* (2013.01); *F16B 2012/463* (2013.01); *F16B 2012/466* (2013.01); *Y10T 403/7015* (2015.01); *Y10T 403/7045* (2015.01)

(58) Field of Classification Search
None
See application file for complete search history.

(56) References Cited

U.S. PATENT DOCUMENTS

| 4,258,464 A | 3/1981 | Ullman, Jr. |
| 5,688,030 A | 11/1997 | McAnally et al. |

FOREIGN PATENT DOCUMENTS

| CN | 201050526 Y | 4/2008 |
| CN | 201297587 (Y) | 8/2009 |
| DE | 2340307 A1 | 2/1975 |
| DE | 298 10 385 U1 | 12/1998 |
| DE | 298 01 231 U1 | 6/1999 |
| DE | 1 178 225 A1 | 2/2002 |
| DE | 10 2005 053321 A1 | 5/2007 |
| DE | 10 2007 058662 A1 | 6/2009 |
| DE | 10 2010 014662 A1 | 10/2011 |
| EP | 1 178 225 A1 | 2/2002 |
| FR | 2446946 A1 | 8/1980 |
| WO | WO 2004/111471 A1 | 12/2004 |
| WO | WO 2010034467 A1 \* | 4/2010 |

\* cited by examiner

*Primary Examiner* — Victor Macarthur
(74) *Attorney, Agent, or Firm* — Condo Roccia Koptiw LLP

(57) ABSTRACT

A joint for assembling two furniture parts to each other is disclosed. A first furniture part has a male part for co-operation with a female part of a second furniture part. Each of the male and female parts has a number of grooves. At assembly the male part is moved along the female part via co-operation between the grooves of the male and female part, respectively. The co-operating male and female parts have an insertion position and an end position, in which end position the furniture parts are assembled to each other. The grooves of one of the female and male parts are compressed during movement from the insertion position to the end position. The grooves of the pair of co-operating female part and male part are such that the furniture parts are pressed toward each other when the male part is moved along the female part.

16 Claims, 13 Drawing Sheets

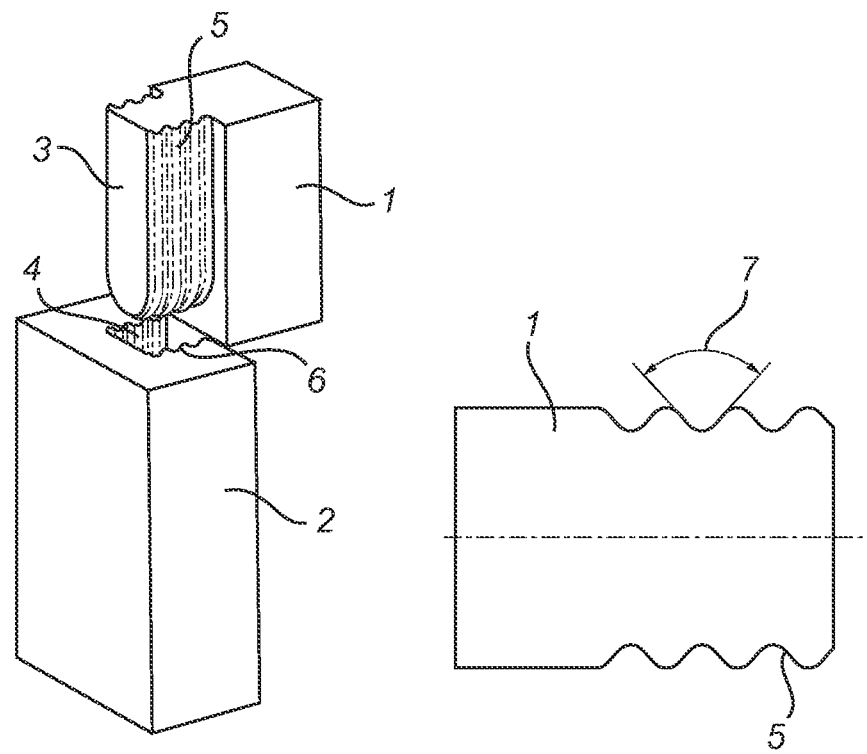
Fig. 1
Fig. 2
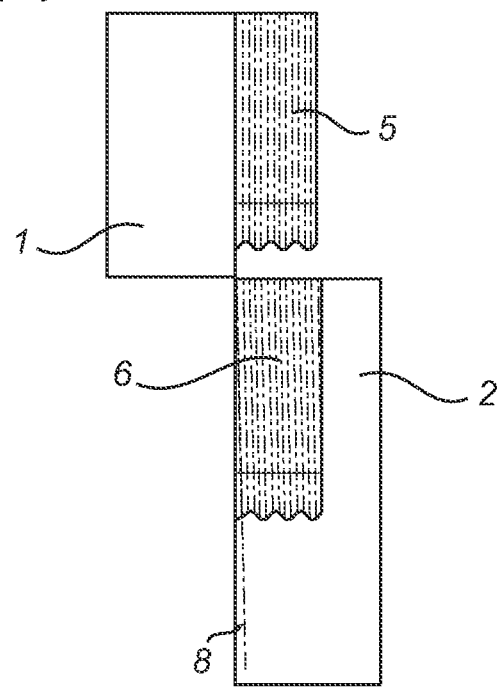
Fig. 3

FURNITURE JOINT

CROSS-REFERENCE TO RELATED APPLICATIONS

This application is a continuation-in-part of Patent Cooperation Treaty Application No. PCT/EP2012/050469, filed Jan. 13, 2012, the contents of which are hereby incorporated by reference herein in their entirety.

TECHNICAL FIELD

The present invention concerns a joint between two furniture parts.

PRIOR ART

To join furniture parts to each other many different ways have been used throughout the years. Often different types of mechanical fastening means are used. It is also known to give the furniture parts different shapes, such as grooves, for forming joints between the furniture parts.

For self-assembly furniture it is important that the different furniture can be assembled to each other in a safe and relatively simple way. This is especially important when the customer is to assemble the furniture. It is therefore always an aspiration to improve the joints between the different furniture parts. Such improvements of joints have many components. The improvements may concern the quality of the joint, i.e. how well the furniture parts are assembled to each other, may concern the manufacturing cost, may concern ease of assembly etc.

SUMMARY

One object of the present invention is to be able to arrange joints for assembly of furniture parts to each other. The joints should be practical to use and yet give a secure assembly of the furniture parts. A further object is that the furniture parts may be assembled without the need of any fastening means and without the use of any tools. It should also be possible to open to separate the furniture parts from each other after assembly, without harming the furniture parts.

According to one aspect of the present invention a joint for assembly of a first furniture part and a second furniture part to each other is arranged. The first furniture part has one or more male parts co-operating with one or more female parts of the second furniture part. Each of the male and female parts has a number of grooves. At assembly the male parts are moved along the female parts by means of co-operation between the grooves of the male and female parts. The co-operating male and female parts have an insertion position and an end position, in which end position the furniture parts are assembled to each other. The grooves of one of the female and male parts incline in relation to the grooves of the other part, whereby the furniture parts are pressed toward each other when the male part is moved along the female part.

The female part may be tapered such that an opening of the female part is wider at an insertion position than at an end position.

As used in this description "furniture part" means any type of furniture part, such as a leg, shelf, side, top but also any type of appliance, such as a hinge or a door knob.

Further objects and advantages of the present invention will be obvious to a person skilled in the art reading the detailed description below of different embodiments.

BRIEF DESCRIPTION OF THE DRAWINGS

The invention will be described further below by way of examples and with reference to the enclosed drawings. In the drawings, FIG. 1 is a part view of one example of a joint according to the present invention, FIG. 2 is a view from above of one example of a male part of a joint according to the present invention, FIG. 3 is a side view, partially cut out, illustrating one aspect of the present invention.

DETAILED DESCRIPTION OF EMBODIMENTS

Figure 4:
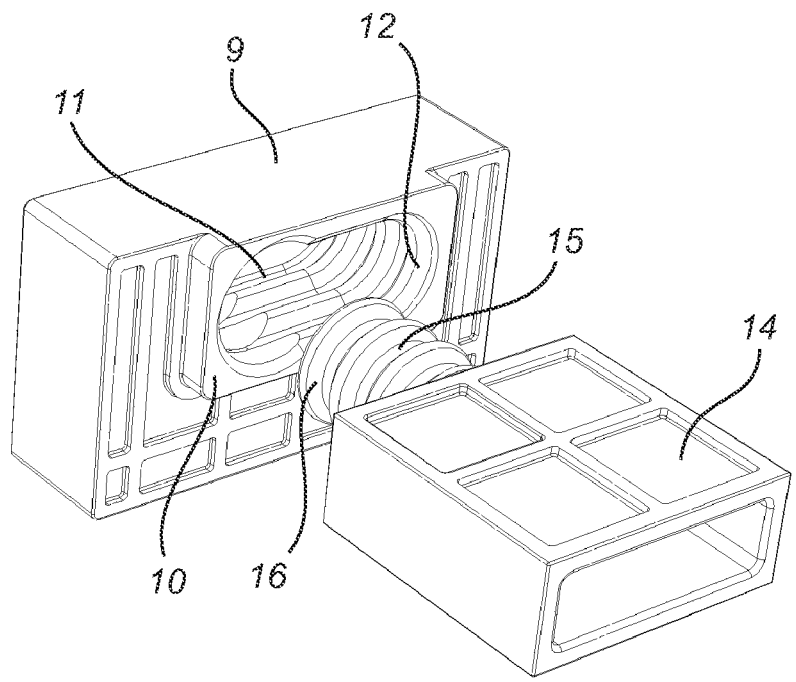
FIG. 4 is a perspective view of a further example of co-operating female and male parts according to the present invention.

According one embodiment of the present invention shown in FIGS. 1-3 a joint is formed between two furniture parts, in that a male part 3 of a first furniture part 1 co-operates with a female part 4 of a second furniture part 2. The male part 3 has a number of grooves 5 co-operating with corresponding grooves 6 of the female part 4. The male part 3 is to be inserted at one end of the female part 4 and is then to be slid to an opposite end of the female part 4.

The grooves 6 of the female part 4 inclines slightly in longitudinal direction, whereby the first furniture part 1 having the male part 3 is drawn or pulled against the second furniture part 2 during the sliding movement for the male part 3 inside the female part 4. The grooves 6 of the female part 4 inclines somewhat in relation to a general plane for the furniture part 2. Said inclination of the grooves 6 of the female part 4 is indicated by the angle 8 as shown in FIG. 3. The angle 8 is shown as taken between the side of the female part 2 and an imaginary extension of one of the grooves 6 of the female part 2. The inclination angle 8 is in the order of up to 5°. Preferably, the inclination angle 8 is between 0.5° and 5° and most preferred the inclination angle 8 is about 2°. If the inclination angle 8 is too small the furniture parts 1, 2 may not be pulled together in a proper way, leaving a gap between the furniture parts 1, 2. If the inclination angle 8 is too big, it may be difficult to slide the male part 1 along the female part 2. The inclination angle 8 is partly dependent on the length of the grooves 6 of the female part 2, thus, the length the male part 1 will slide. The longer said length is, the smaller the inclination angle 8 may be.

In this description the female parts are generally shown having inclined grooves, while the male parts have straight grooves. However, it is also possible to let the male parts have inclined grooves and let the female parts have straight grooves. A further possibility is to have inclined grooves alternating between the female parts and the male parts, but in each joint one of the male and female parts will have inclined grooves while the other part has straight grooves.

In the assembly of the two furniture parts 1, 2 to each other the grooves 6 of the female part 4 will be slightly compressed, due to the inclination of the grooves 6 of the female part 4. In order for the compression to work the material of the grooves 6 of the female part 4 should be softer than the material of the grooves 5 of the male part 3. By means of the compression of the female part 4 the furniture parts 1, 2 are locked to each other. The female part 4 and the male part 3 are given a position and the grooves 6 of the female part 4 incline in such a way that the furniture parts 1, 2 are abutting each other and that they are placed in desired positions in relation to each other after assembly.

The grooves 5 of the male part 3 do not incline in longitudinal direction. As seen in cross section the sides of each groove 5 of the male part 3 forms an angle 7 of about 90°. By letting the grooves 5 form an angle of about 90°, the pressure of the joint will be distributed in a suitable way. The grooves 6 of the female part may also have an angle of about 90°.

In the embodiment of FIG. 1 the male part 3 is made in one piece with the first furniture part 1 and the female part 4 is made in one piece with the second furniture part 2. If the first and second furniture parts 1, 2 are made of wood the male part 3 and the female part 4 are made by milling and/or turning. In other embodiments the male part is a separate part, which is to be fixed to a furniture part.

In the embodiment of FIG. 1 the female part 4 is open towards an end of the second furniture part 2. The open end of the female part 3 forms an insertion opening. The male part 3 of the first furniture part 1 has an oblong extension and the grooves 5 extend along three sides of the male part. There are no grooves on an end side of the male part 3, which end side of the male part 3 is to be flush with an end side of the first furniture part 1 after assembly. To facilitate insertion of the male part 3 into the female part 4, the side of the male part 3 opposite the side having no grooves is rounded. In assembly of the first and second furniture parts 1, 2 to each other the male part 3 is slid along the female part 4 until the male part 3 reaches an end position, where it abuts the bottom of the female part 4. In said assembled condition the grooves 5 of the male part 3 and the grooves 6 of the female part 4 are in contact along the total extension of the grooves 5, 6 of the male part 3 and the female part 4, respectively.

Figure 5:
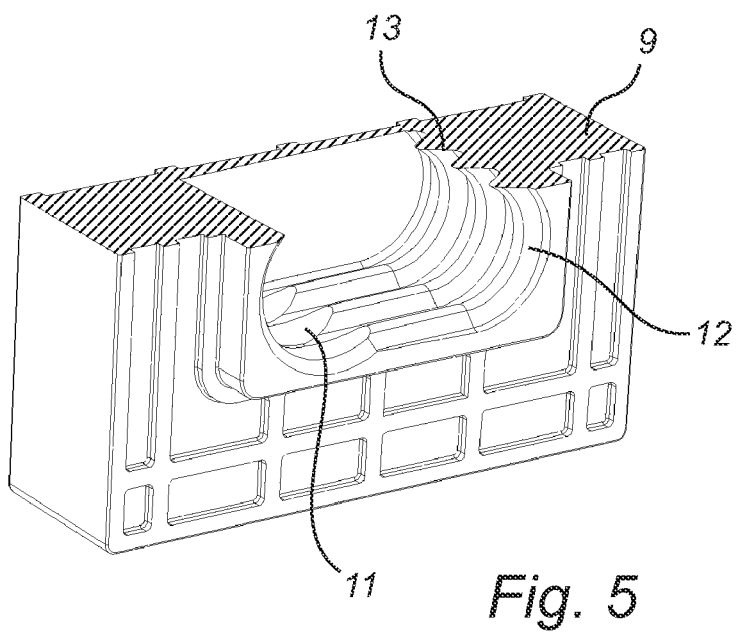
FIG. 5 is a cut view of the female part of FIG. 4.
Figure 6:
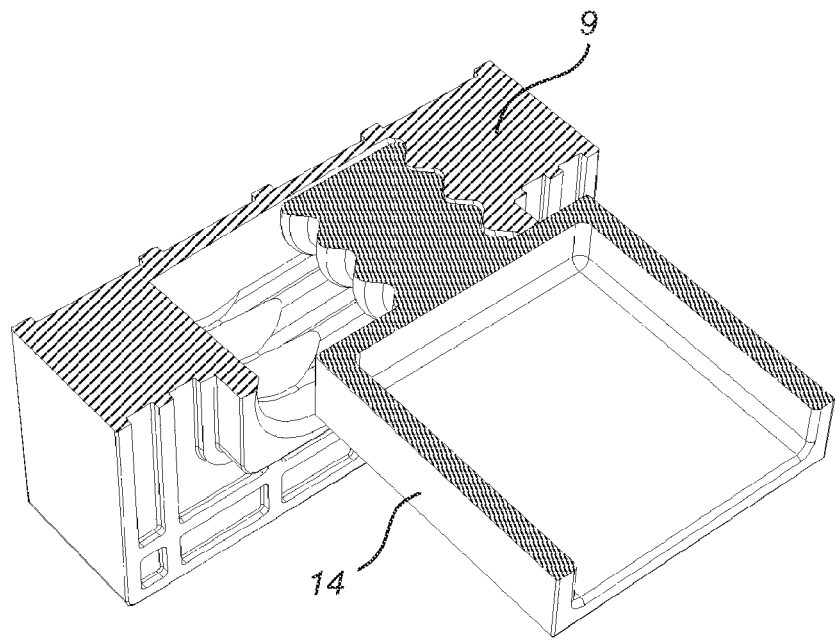
FIG. 6 is a cut view of a joint formed by the male part and female part of FIGS. 4 and 5.

In the example of FIGS. 4 to 6 a first joint part 9 having a female part 10 is to co-operate with a second joint part 14 having a male part 16. The grooves 13 of the female part 10 are arranged to go from an insertion opening 11 to an inner end 12. In the insertion opening 11 of the female part 10 there are no grooves in order for being able to receive the male part 16. In assembling the first and second joint parts 9, 14 to each other the male part 16 is inserted in the insertion opening 11 of the female part 10. The male part 16 is pushed into the insertion opening until it abuts the bottom of the female part 10. The male part 16 is then slid along the female part 10, by co-operation between the grooves 13, 15 of the female part 10 and male part 16, respectively, until the male part 16 is at the inner end 12 of the grooves 13 of the female part 10. In the same way as stated above, the grooves 13 of the female part 10 inclines. The inclination is such that the second joint part 14, having the male part 16, is pulled towards the first joint part 9, having the female part 10. The inner dimension of the insertion opening 11 of the female part is somewhat larger than the outer dimension of the male part 16, in order to facilitate insertion of the male part 16 into the female part 10. During the sliding movement of the male part 16 along the female part 10 the grooves 13, 15 are compressed.

In the embodiment of FIGS. 4 to 6 the male part 16 and the female part 10 are made as parts of the first and second joint part 9, 14, respectively. The joint parts 9, 14 are to be received in openings or sides of furniture parts to be joined to each other. The joint parts 9, 14 may be fixed to the openings or sides of the furniture parts in different ways, such as by glue or ultra sound welding. As described above the female part 10 has an insertion opening 11 from which opening a number of grooves extends to an inner end 12. In the shown embodiment the male part 18 has the form of a pin.

A person skilled in the art realizes that the male and female parts of the joint parts in other embodiments have corresponding shapes to those shown in FIG. 1. Thus, the male part may be oblong as seen in end view and with a rounded end. In corresponding way the female part of the joint part may have an open end to receive a male part having an oblong form.

Figure 7:
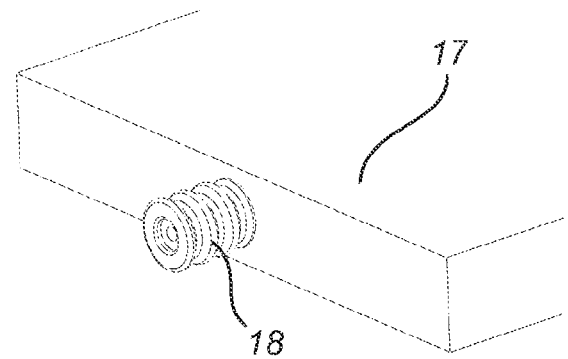
FIG. 7 is a perspective view of a furniture part having a male part.

In FIG. 7 one example of a shelf 17 having an integrated male part 18 is shown. The male part 18 may be attached in different ways to the shelf 17, such as by glue, welding, inserted in an opening.

Figure 8:
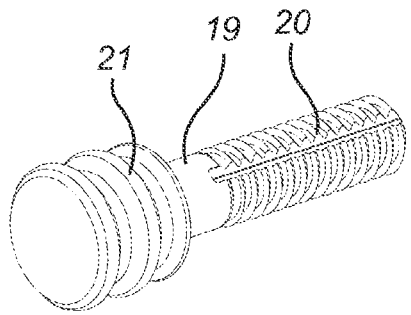
FIG. 8 is a perspective view of one example of a male part according to the present invention, which male part is to be attached to a furniture part.

In FIG. 8 a male part 19 is shown. One end of the male part 19 has the form of a peg 20, which peg 20 is to be received in an opening of a furniture part. The peg 20 as shown has been developed for fixation in the opening of the furniture part by means of glue. In the end of the male part 19 opposite the peg 20, a number of grooves 21 are arranged for co-operation with grooves of a female part.

Figure 9:
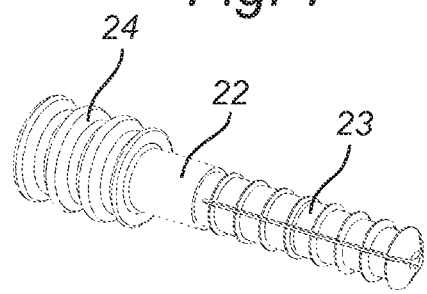
FIG. 9 is a perspective view of a further example of a male part according to the present invention, which male part is to be attached to a furniture part.

In FIG. 9 a further example of a male part 22 is shown. The male part 22 has a peg 23 at one end, which peg is to be fixed to an opening of a furniture part in that the peg 23 is to expand. At the end opposite the peg 23, the male part 22 has a number of grooves 24 for co-operation with grooves of a female part. The expansion of the peg 23 may accomplished by insertion of a pin in an opening in the centre of the male part 22.

Figure 10:
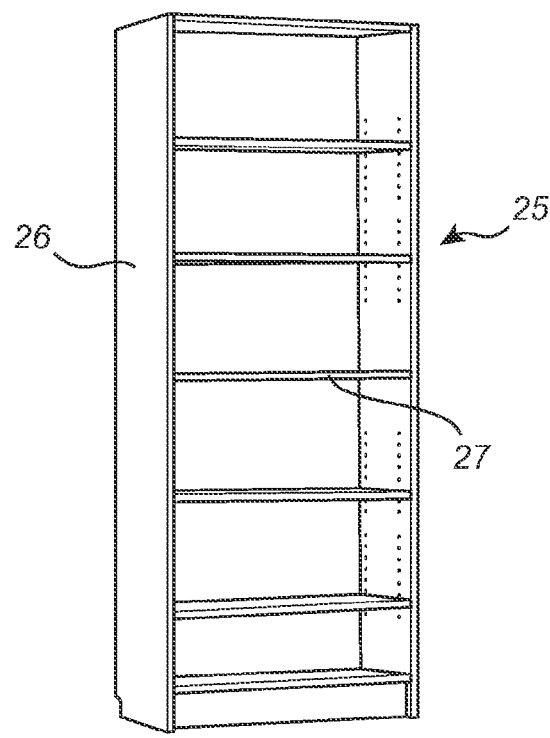
FIG. 10 is a perspective view of a bookcase wherein the joints of the present invention may be used to attach different parts of the bookcase to each other.
Figure 11:
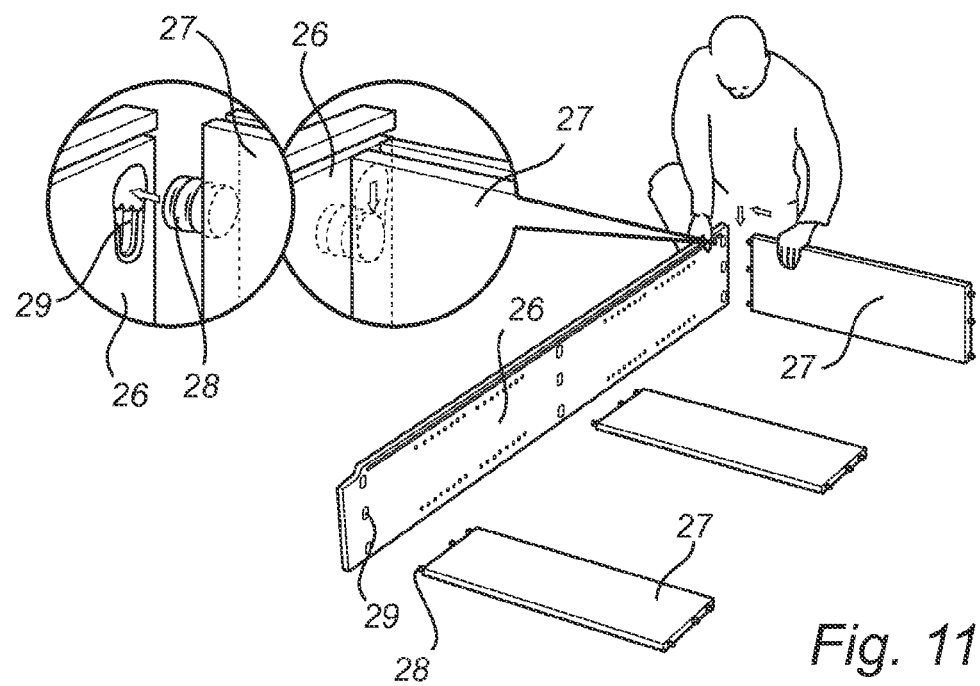
FIG. 11 is a perspective view illustrating assembly of the bookcase of FIG. 9.

In the embodiment of FIGS. 10 and 11 each male parts 28 has the form of a pin projecting from one side of a first furniture part, which first furniture part in this case is a shelf 27 of a bookcase 25. The male parts 28 of the shelves 27 are to co-operate with female parts 29 of sides 26 of the book case 25. In the shown embodiments three male parts 28 are arranged at opposite ends of a shelf 27 for co-operation with three female parts 29 on respective side 26 of the bookcase 25. The male parts 28 have a number of groves, in the same way as described above. The male parts are made in one piece with the furniture part or are made as separate parts. If the pins are separate parts they are attached to the furniture part in any suitable way. The possible fixation of the pins to the furniture part may be accomplished by means of different fastening means, glue, soldering or welding.

In FIG. 11 a way of assembling two furniture parts to each other is indicated. In a first step the three male parts 28 on one end surface of a shelf 27 are each placed in the insertion opening of a female part 29 of one side 26. The male parts 28 of the shelf 27 are then slid along the female parts 29 of the side 26 until the male parts 28 reach the inner ends of the grooves of the female parts 29.

Figure 12:
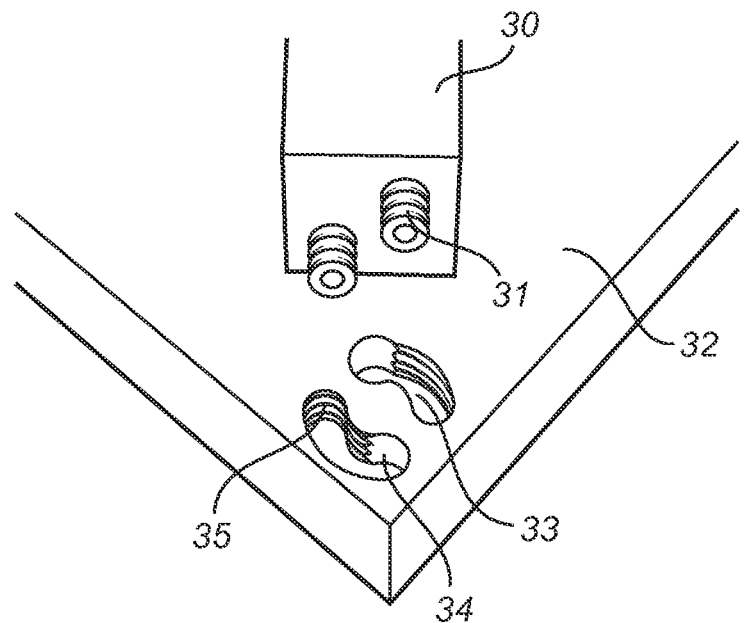
FIG. 12 is a perspective detail view of a table leg and a table top to be joined to each other using a joint according to the present invention.
Figure 13:
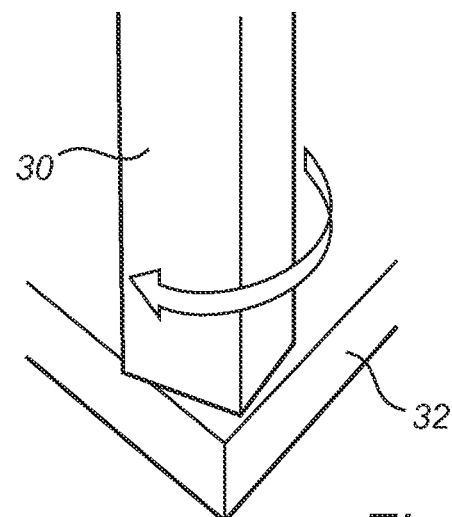
FIG. 13 is a perspective view of the table leg and table top of FIG. 12, indicating the way the leg is to be attached to the table top.

In FIGS. 12 and 13 a further example of a joint according to the present invention is indicated. In the shown example a table leg 30 is to be assembled to a table top 32. The table leg 30 has two male parts 31 at an end of the table leg to be attached to the table top 32. Two female parts 33 are arranged at a short distance from each other on a lower side of the table top 32. The female parts 33 are arranged in the area of a corner of the table top 32. Said female parts 33 have a curved form and in a corresponding way as described above the female parts 33 have an insertion opening 34 and an inner end 35. Furthermore, the female parts 33 have grooves that incline in longitudinal direction from the insertion opening 34 towards the inner end 35 of respective female part. The female parts 33 of the table top 32 are to receive the two male parts 31, in the form of pins, of the table leg 30. The table leg 30 is to be assembled to the table top 32 in that the male parts 31 are inserted into the insertion openings 34 of the female parts 33, where after the table leg 30 is turned in such a way that the male parts 31 while slide inside the female parts 33 until the male parts 31 reach the inner ends 35 of the grooves of the female parts 33 of the table top 32. The movement of the table leg 30 during assembly is indicated by the arrow in FIG. 13. In the same way as described above, the grooves of the female parts 33 will be compressed by means of the inclining grooves giving a locking function between the table leg 30 and table top 32 in assembled condition. In one embodiment (not shown) a pin placed in the middle of the side of the table leg having the two male parts is to be received in an opening placed between the female parts of the table top. The function of the pin of the table leg and the opening of the table top is to correctly position the table leg in relation to the table top.

In a further alternative embodiment both the male part and the female part has a general circular cross section. Hereby the male part is inserted in an insertion position in relation to the female part. The male part is then rotated in the female part until it reaches an end position. The male and female parts have a number of grooves and in the same way as described above the grooves of one of the male and female parts incline in relation to the grooves of the other part. The inclination of the grooves is such that the furniture parts having the male and female parts will be drawn against each other. As stated above the furniture parts may include parts or appliances of different types of furniture.

In one embodiment the female part has a slightly triangular shape in plain view, whereby the female part tapers from an insertion opening towards an inner end. At the inner end the width of the grooves of the female part is slightly smaller than the width of the grooves of the male part, giving a distinct end position. The triangular shape of the female part may be given by letting a milling head follow a slightly different track from the insertion opening to the inner end than from the inner end to the insertion opening. Having a distinct end position may give a user confirmation that the furniture parts are assembled to each other in a proper way.

FIGS. 14A-H illustrate examples for assembling two furniture parts (e.g., furniture part 126 and furniture part 127) to each other using a male part and using a female part that is tapered. For example, the male and female parts 128, 129 illustrated in FIGS. 14A-H may be used for assembling or joining together the furniture parts 126, 127 illustrated with respect to FIG. 11 (e.g., a shelf of a book case). However, the joints illustrated in FIGS. 14A-H may be used for assembling various other types of furniture parts, such as furniture arms with a base, furniture drawers, furniture posts, etc. As shown in FIGS. 14A-H, an opening of the female part may be tapered such that a first groove width across the opening of the female part near or substantially adjacent to the insertion position is wider than a second groove width across the opening of the female part near or substantially adjacent to an end position. For example, the groove width across the opening of the female part may be continuously and/or linearly decreased between the insertion position and the end position or a portion thereof.

Figure 14A:
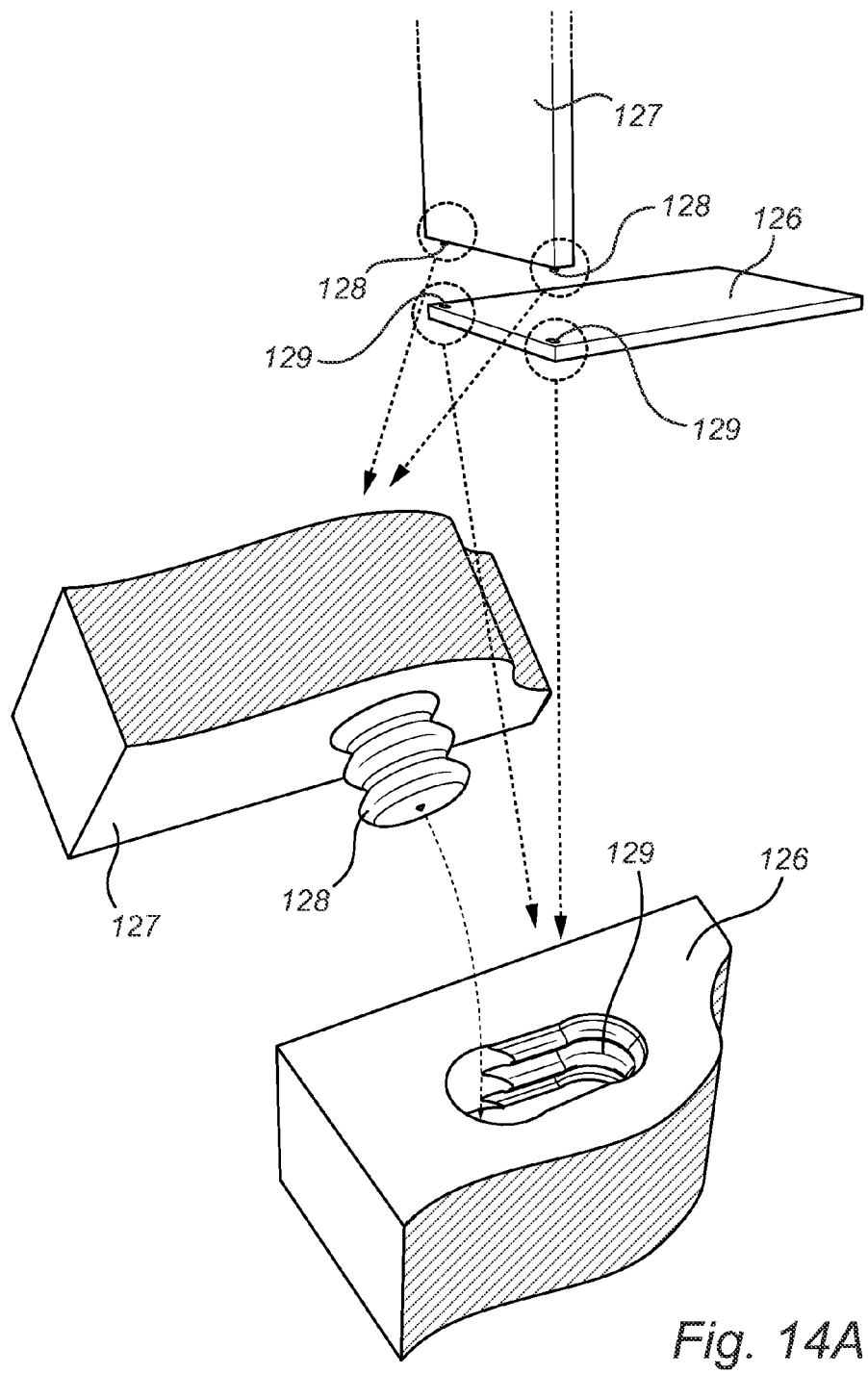
FIGS. 14A-H illustrate examples for assembling two furniture parts to each other.

For example, FIG. 14A illustrates a first furniture part 127 and a second furniture part 126. The first furniture part 127 may include two male parts 128 for assembling the first furniture part 127 with the second furniture part 126. The second furniture part 126 may include two corresponding female parts 129. The male parts 128 are configured to operably cooperate with the female parts 129 in order to assemble the two furniture part 126, 127 to each other (e.g., as described in FIGS. 14B-H). Although the example illustrated in FIG. 14A utilizes two furniture joints for assembling furniture parts 126, 127, as may be appreciated any suitable number of cooperating female and male parts, for example three male and three female parts as described with respect to FIG. 11, may be used for joining furniture parts together depending on the nature of the assembly. Additionally, although the interaction between the male part 128 and the female part 129 may be described singularly, the description may be equally applicable to multiple sets of male and female parts 128, 129 used for joining two furniture parts together.

Figure 14B:
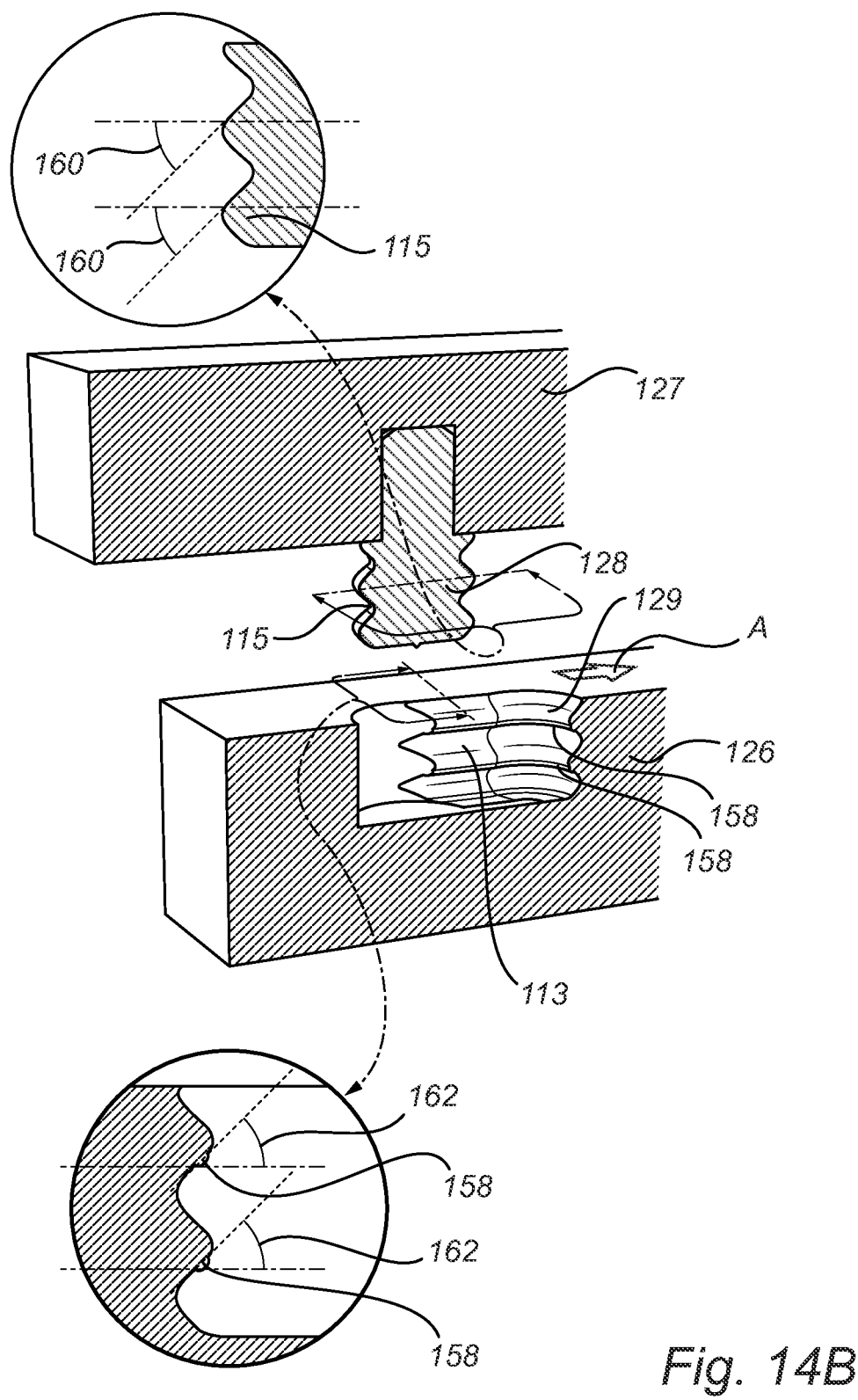

For example, FIG. 14B illustrates a perspective view for describing the interaction of a joint including a female part and a male part. FIG. 14B shows a cross section through a joint including a male part 128 and a female part 129. FIG. 14B may illustrate a first step in a sequence of joining the first furniture 127 part with the second furniture part 126. For example, a male part 128 of the first furniture part 127 may be inserted in a female part 129 of the second furniture part 126. The male part 128 may be a portion of the first furniture part 127 or may be a separate structural part that has been inserted into and/or operably affixed to the first furniture part 127 (See e.g., FIGS. 8 & 9 and the description thereof). The male part 128 of the first furniture part 127 may be inserted in the female part 129 of the second furniture part 126 at a specific insertion position. The insertion position may correspond to a position whereby grooves 115 of the male part 128 are able to first interact or otherwise join together with grooves 113 of the female part 129. For example, the insertion position may correspond to a location where the male part 128 is first inserted into the female part 129 before moving the male part 128 along an assembly direction in order to allow the grooves 115 of the male part 128 to operably interact and cooperate with the grooves 113 of the female part 129 (e.g., as is described with respect to FIGS. 14B-H).

The grooves 115 of the male part 128 may be configured to cooperate with grooves 113 of the female part 129 to join together the two furniture parts 126, 127. The grooves 115 of the male part 128 may have a groove inclination 160. The grooves 113 of the female part 129 may have a groove inclination 162. The groove inclinations 160, 162 are illustrated in enlarged portions of FIG. 14B. The groove inclination of the female grooves 113 may be measured with respect to a plane extending perpendicularly from the side walls of the female part 129 (e.g., including the line in assembly direction A; illustrated as a dashed line in FIG. 14B). Similarly, the groove inclination of the male grooves 115 may be measured with respect to a plane extending perpendicularly from a face of the male part 128 (e.g., as illustrated in the dashed line in FIG. 14B).

In the example shown in FIG. 14B, the groove inclination 160 of the male part 128 may have a groove inclination angle of approximately 45°. The grooves 113 of the female part 129 may have a corresponding groove inclination 162 of approximately 45°; however, other corresponding groove inclination angles may be used for the grooves 115 of the male part 128 and the grooves 113 female part 129, provided that the groove inclinations used allow the male part 128 and the female part 129 to be operably coupled during assembly.

For example, the inclination 160, 162 of the grooves 113, 115 may be configured to lock or strengthen the joint. Although the illustrated inclination 160, 162 of the grooves 113, 115 are approximately 45°, an inclination 160, 162 between 0-90° may be used to achieve similar results. In an example, the inclination 160, 162 may be at an inclination angle between 5-85°. For other assemblies, the inclination 160, 162 may be at an inclination angle between 25-65°. The purpose of the groove inclinations 160, 162 will be described in more detail with respect to FIG. 14D. Also illustrated in FIG. 14B are two deformation zones 158 at the female grooves 115, which will be described with respect to FIG. 14G.

Figure 14C:
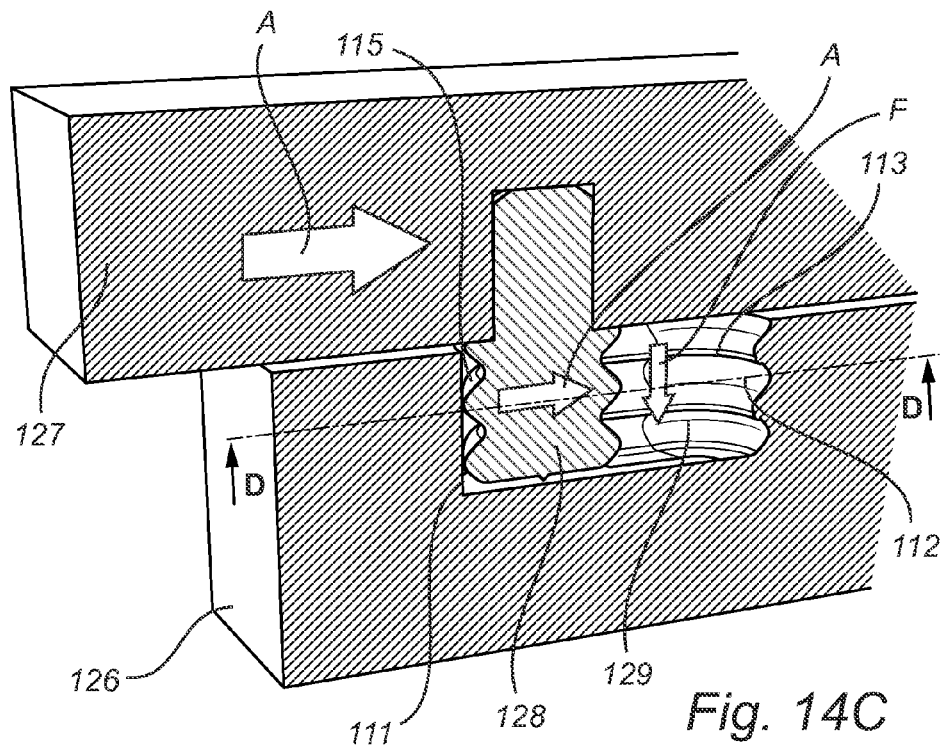

FIG. 14C illustrates a perspective view with a cross section taken through the joint after inserting a male part into a female part (e.g., at an insertion position). In order to join the first furniture part 127 with the second furniture part 126, the male part 128 of the first furniture part 127 may be inserted into the female part 129 of the second furniture part 126 at an insertion position 111 of the female part 129. To operably connect the first furniture part 127 with the second furniture part 128, the male part 128 of the first furniture part 127 may be moved along grooves 113 of the female part 129 of the second furniture part 126 in an assembling direction A. Moving the male part 128 in the assembly direction A may correspond to the second step in assembling the two furniture parts 126, 127. When moving the male part 128 with respect to the female part 129 in the direction A, grooves 115 of the male part 128 are operably configured to cooperate with the grooves 113 of the female part 129 in order to join furniture parts 126, 127 together. For example, the inclination angle of the grooves 115 of the male part 128 and the inclination angle of the grooves 113 of the female part 129 may be complementary (e.g., both 45°, one at 50° and the other at 40° degrees, one at 55° degrees and the other at 35° degrees, etc.), allowing the grooves 113, 115 to operably couple to each other when in close contact. The male part 128 may be moved along assembly direction A until the male part 128 reaches an end position 112 of the female part 129.

Figure 14D:
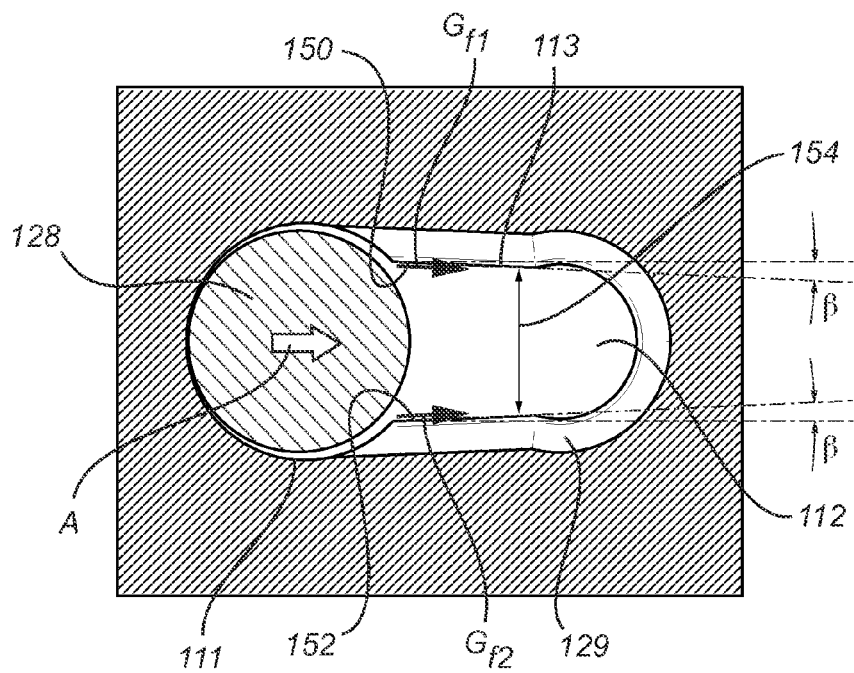

FIG. 14D illustrates a top cross section of an example furniture joint in a similar position as the one illustrated in FIG. 14C (e.g., the male part 128 is at insertion position 111). For example, FIG. 14D illustrates the view from the perspective of the top plane through the line D-D in FIG. 14C. Thus, in FIG. 14D the male part 128 is arranged at the insertion position 111 of the female part 129 and moved in the assembling direction A towards the end position 112 of the female part 129. In an example, to operably couple the first furniture part 127 with the second furniture part 126, the grooves 113 of the female part 129 may be inclined from the assembling direction A by an angle β. The angle β may be an acute angle, such as an angle greater than 0° and less than 90°. In an example, the angle β may be a severely acute angle, for example an angle greater than 0° and less than 5.0°. An angle greater than 0° but less than or equal to 5° may be referred to a severely acute angle for purposes of this disclosure. As a result of inclining the grooves 113 of the female part 129 with respect the assembling direction A, the female part may become tapered in shape.

Thus, in other words, the grooves 113 of the female part 129 may be arranged such that a distance 154 between the grooves 113 of the two opposing sides 150, 152 of the female part 129 is larger close to the insertion position 111 than at the end position 112. The grooves 113 of the female part 129, in the two opposing sides 150, 152 of the female part 129, may be positioned along two female part groove directions $G_{f1}$, $G_{f2}$. Thus, each of the two female part groove directions $G_{f1}$, $G_{f2}$ may be set at the angle β with respect to the assembling direction A. By setting the groove directions $G_{f1}$, $G_{f2}$ at angle with respect to the assembling direction, the female part 129 may have a slightly triangular shape that tapers from the insertion position 111 towards the end position 112. Having the distinct end position 112 may give a user confirmation that the furniture parts 127, 126 are assembled to each other in a proper way.

Further, by tapering the female part 129, the male part 128 may be afforded additional space for movement relative to the female part 129 at the insertion position 111 as compare to the amount of space for movement of the male part at the end position 112. As a result, as the grooves 115 of the male part and the grooves 113 of the female part 129 interact as the male part 128 is moved in the assembling direction A, the male part 128 may be forced into a more close-fitting position with respect to the female part 129. For example, the end position 112 may correspond to a position where the first furniture part 127 and the second furniture part 126 are substantially flush with each other. On the other hand, the tapering of the female part 128 may allow for a relatively small amount of movement of the first furniture part 127 relative to the second furniture part 126 when the male part 128 is first inserted to the insertion position 111. As the male part 128 is moved in the assembly direction A, the spacing between the grooves 115, 113 may decrease, continually decreasing the amount of space available for movement of the male part 128 relative to the female part 129. As a result, the amount of space available for movement of the first furniture part 127 relative to the second furniture part 126 may also be decreased.

For example, as shown in FIG. 14D the male part 128 has been inserted at the insertion position 111 of the female part 129. The space available for the male part 128 in the female part 129 at the insertion position 111 may be made slightly larger than the male part 128 itself, providing the male part 128 space to move slightly in all directions at the insertion position 111. Such spacing may facilitate the initial insertion of male part 128 into female part 129. As the male part 128 is moved in the assembling direction A, the space available for the male part 128 decreases. In an example, the space available for the male part 128 in the female part 129 may be continuously decreased, due to the deviation angle β between the female groove directions $G_{f1}$, $G_{f2}$ and the assembling direction A. By continuously decreasing the space available to the male part 128 when it is moved in assembling direction A, the movement of the male part 128 of the first furniture part 127 may be guided along the female part 129 of the second furniture part to end position 112.

Further, the space available for the male part 128 in the female part 129 during movement in the assembling direction A as well as how fast the amount of space available is decreased may be affected by the values of the inclination 160, 162 (See e.g., FIG. 14B) of the grooves 113, 115. For example, as the male part 128 is moved from the insertion position 111 to the end position 112 of the female part 129, the inclination 160, 162 of the grooves 113, 115 may be configured such that the space available for the male part 128 is continuously decreased, thereby forcing the male part 128 towards the female part 129 in a direction F (See e.g., FIG. 14C). The direction F may be substantially perpendicular to the assembling direction A, thereby forcing the first furniture part 127 and the second furniture part 126 towards each other. Such perpendicular forcing motion by the joints may facilitate a tight assembly between the furniture parts 126, 127.

Figure 14E:
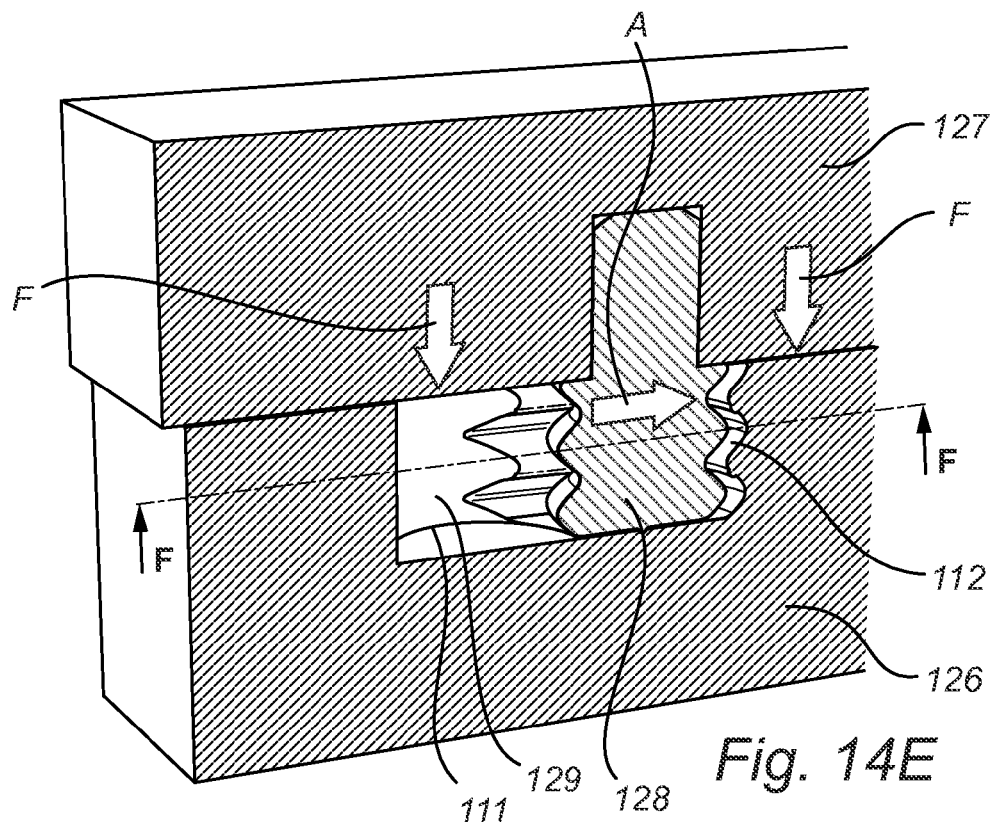

FIG. 14E illustrates a perspective view—similar to that of FIG. 14C—as the male part 128 is moved from the insertion position 111 to the end position 112 of the female part 129. For example, as the first furniture part 127 with the male part 128 is moved in the assembling direction A along the female part 129, the female part groove directions $G_{f1}$, $G_{f2}$ (See e.g., FIG. 14C) may cause the space available for the male part 128 to be decreased, bringing grooves 113, 115 into closer contact. The decrease in space available to the male part 128 along with the interaction of grooves 113, 115 may result in the furniture part 127 being forced in a direction F, which may be essentially perpendicular to the assembling direction A. The male part 128 being forced in the direction F may result in the first furniture part 127 being moved into a desired assembly position with respect to the second furniture part 126.

In other words, the first furniture part 127, with the male part 128, is forced towards the second furniture part 126, with the female part 129, in the direction F as the male part 128 is moved in the female part 129 in the assembling direction A, resulting in the furniture parts 126, 127 being assembled in their desired end positions relative to each other. As may be appreciated, the female part 129/the second furniture part 126 may be forced in a direction opposite to F based on the interaction of the male and female parts 128, 129. The force F may be applied due to the male part 128 having less space available for movement at the end position 112 as compared to at the insertion position 111.

Figure 14F:
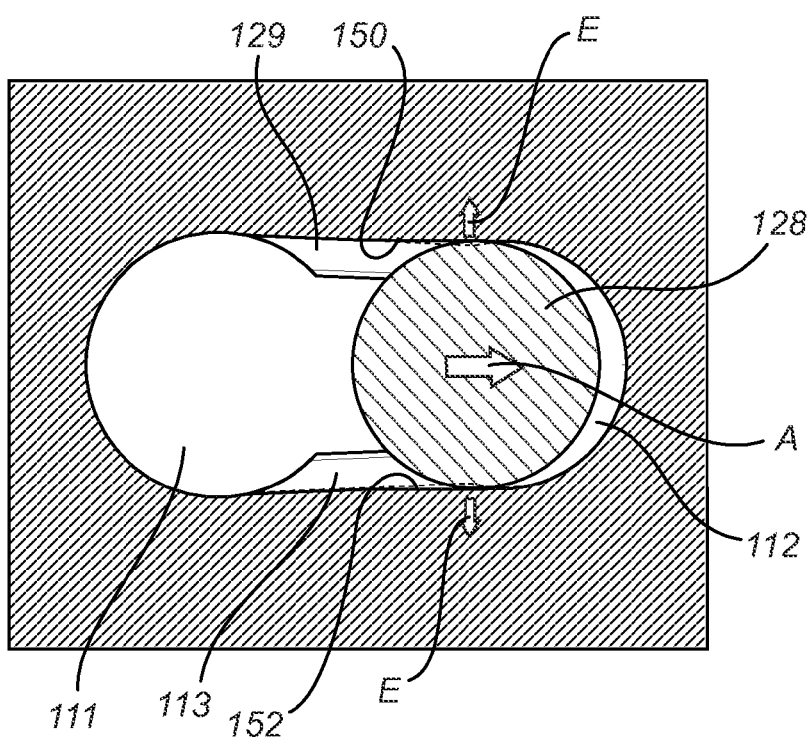

FIG. 14F illustrates male and female parts 128, 129 in similar positions as those illustrated in FIG. 14E, although from a top view. For example, FIG. 14F may illustrate the joint assembly as viewed in cross section from above along the line F-F of FIG. 14E. As described above, the male part 128 may have been moved from the insertion position 111 towards the end position 112 of the female part 129 along the assembling direction A. Just before the male part 128 has reached the end position 112 of the female part 129, a contraction of one or more of the female part 129 and/or the male part 128 may be effected. The contraction or tightening of one or more of the female part 129 and/or the male part 128 may be illustrated by arrows E in FIG. 14F. The contraction may be initiated when the male part 128 is moved along assembly direction A and reaches a position that results in distance 154 (See e.g., FIG. 14D) between the two opposing sides 150, 152 of the female part 129 being slightly smaller than the size of the male part 128. Such a position may be relatively near the end position 112. When the contraction point is reached, the male part 128 may be forced to pass a narrow section before entering the end position 112. As a result, a user that assembles the two furniture parts 126, 127 may experience a distinct end position due to the narrow section that the male part 128 passes to reach the end position 112.

In FIG. 14F the contraction is illustrated by dotted lines as one or more of the walls 150, 152 of the female part 129 flex somewhat with respect to the male part 128. However, in other examples the male part 128 may flex with respect to the female part 129. In still other example, both the male part 128 and the female part 129 may both flex with respect to each other.

To ease or smoothen the assembly of two furniture parts (e.g., to provide an easier assembly where less force is required for the user) and/or to provide some tolerances for production of the parts, a deformation zone may be provided on one or more of the female and male parts 128, 129. The deformation zone may provide a preconfigured means for allowing one or more of the male and/or female parts to be bent or deformed with respect to each other during installation. The deformation zone may allow for one or more of the male and/or female parts to be deformed in a predetermined or desired location even when the male and female parts are made of materials with similar hardness. The deformation zones may be configured such that the contact between the male and female parts 118, 129 that results in the contractions of the deformation zone occurs just prior to the male part 128 reaching the end position 112.

Figure 14G:
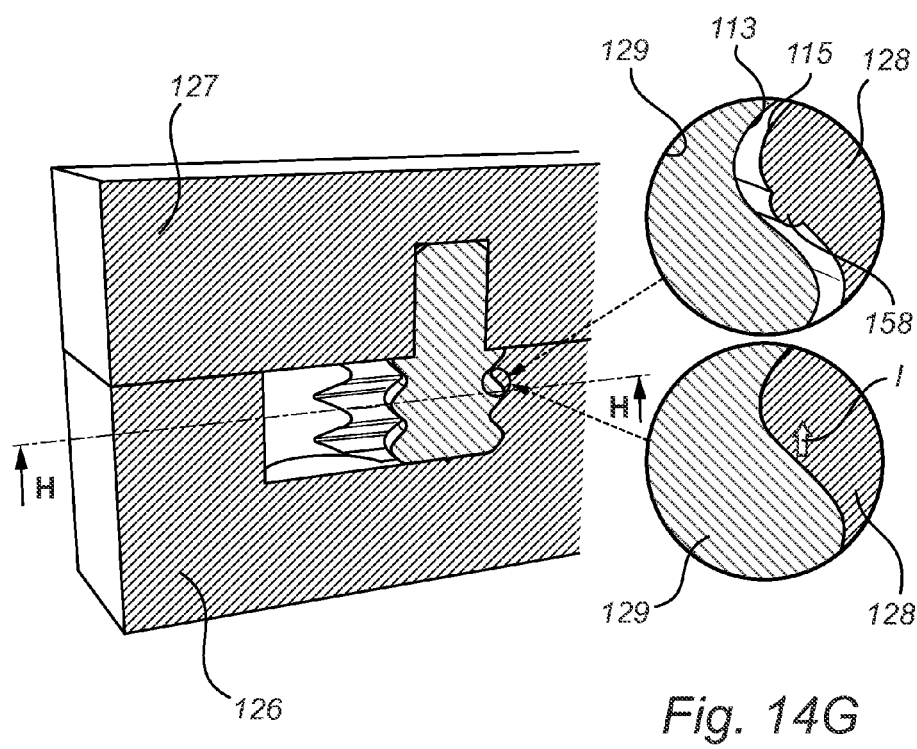

FIG. 14G illustrates an example of a deformation zone 158 that is provided circumferentially on the grooves 115 of the female part 129. Although the deformation is shown with respect to the female part 129 in this example, the deformation may additionally or solely occur at the male part 128 in other examples. As an example, a protrusion to be deformed may be included on the female part 129. For example, the deformation zone 158 may comprise a protruding portion of a groove that has a projected surface towards the cooperating surface of the male part 128. The protruding portion may extend beyond the typical groove 115 of the female part, and the protruding portion may comprise a relatively small portion of the total surface of the female part 129. By utilizing a relatively small protruding portion for the deformation area 158, the pressure applied to the deformation portion during assembly may be higher as compared to other surface areas of the grooves 113, 115, thereby requiring relatively less force to be deformed. The deformation zone 158 may be operably configured such that as the male part 128 reaches the end position 112 of the female part 129, the protruding portion corresponding to the deformation zone 158 is compressed or otherwise deformed, signaling to the user that the furniture parts 126, 127 have been correctly joined.

FIG. 14G illustrates a view similar to the one shown in FIG. 14E after joining together the first furniture part 127 with the second furniture part 126. As shown in FIG. 14G, the first furniture part 127 with the male part 128 has reached the end position 112 of the female part 129. FIG. 14G comprises two zoomed-in drawings of the female and male grooves 113, 115. The upper zoomed image illustrates the male and female parts 128, 129 at an instance just prior to contact that would result in the deformation zone 158 being deformed. The lower zoomed image illustrates the male and female parts 128, 129 after the deformation zone 158 has been deformed (e.g., the male part 128 may have reached the end position 112). The arrow I in the lower zoomed drawing in FIG. 14G is included to illustrate a force acting on the female part 129 by the male part 128, resulting in the deformation zone 158 being deformed as the male part 128 is pressed towards the female part 129. The result of the deformation may be that the deformation zone 158 is compressed into the grooves 115 of the female part 129, allowing the grooves 113, 115 of the male and female parts 128, 129 to be pressed together across the entire (e.g., or a substantial portion of the) surfaces of the grooves 113, 115.

Figure 14H:
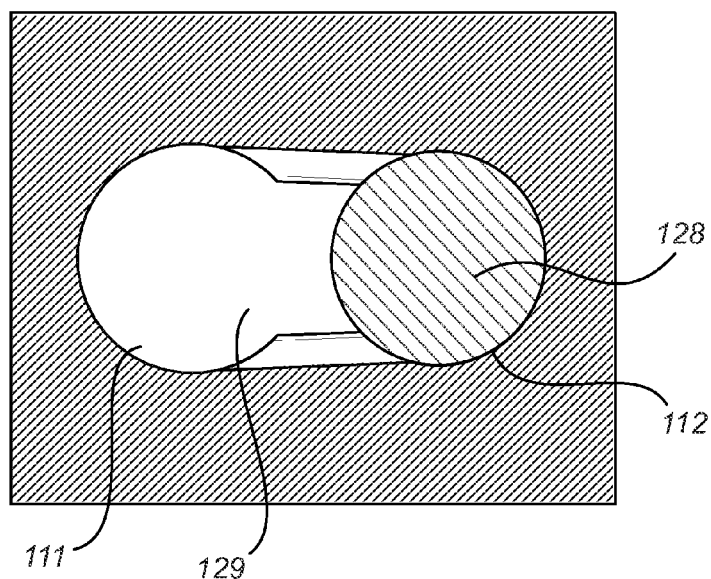

FIG. 14H illustrates a top view of the male and female parts 128, 129 after the male part has been moved to the end position 112 (e.g., and after the deformation zone 158 has been deformed). For example, FIG. 14H may illustrate a top view taken in cross section along the line H-H of FIG. 14G. FIG. 14H illustrates that when the male part 128 has reached the end position 112 of the female part 129, the two furniture parts 126, 127 may be substantially flush with each other when assembled in their final respective positions. The deformation zone 158, after deformation/compression, may no longer protrude from the groves 113 of the female part 129 and/or may protrude substantially less than prior to the male part 128 be moved to the end position 112.

Figure 15A:
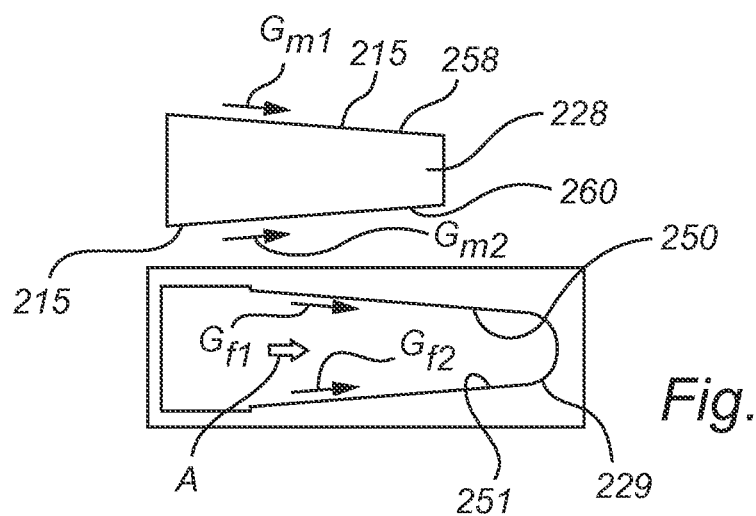
FIGS. 15A-C illustrate various examples of male parts and female parts having different groove directions.
Figure 15B:
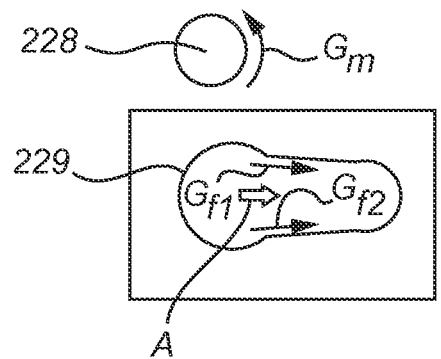
Figure 15C:
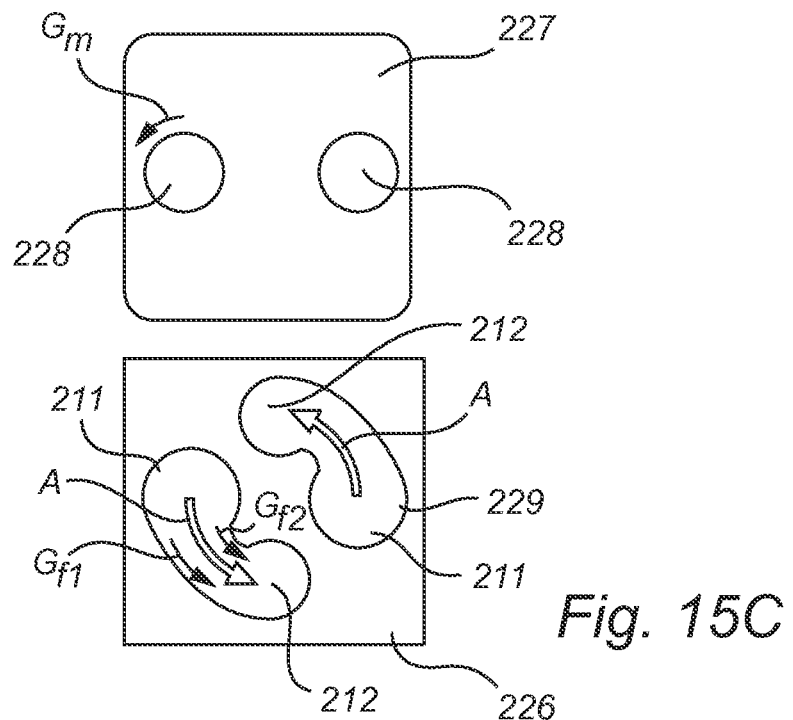

FIGS. 15A-C illustrate examples of male 228 and female parts 229 having various groove directions $G_m$, $G_f$ for the grooves of the male and female parts, respectively.

For example, FIG. 15A illustrates a male part 228 that has a conical shape when seen from above. The sides 258, 260 of the male part 228 may be configured to taper towards each other. Each of sides 258, 260 may be configured with grooves 215 in order to operably interact with female part 229. The grooves 215 of the male part 228 may aligned along two male groove directions $G_{m1}$, $G_{m2}$. The male groove directions $G_{m1}$, $G_{m2}$ may configured such that when the male part 228 moves in assembling direction A (e.g., indicated with an arrow in FIG. 15A), the male grooves interact with the female grooves in order to impart a force on the male and female parts 228, 229 to push them together in a direction substantially perpendicular to the assembling direction A.

The female part 229 shown in FIG. 15A, which may be configured to operably couple with the male part 228, may also have a conical shape for accepting the male part 228. The sides 250, 251 of the female part 229 may also taper toward each other. The grooves 213 of the female part 229 may be aligned along two female groove directions $G_{f1}$, $G_{f2}$. $G_{f1}$ may be inclined at such at angle that interaction of female grooves 213 with males grooves 215 at angle $G_{m1}$ would result in a compression force between the male and female parts in a direction perpendicular to the assembling direction A. Similarly, $G_{f2}$ may be inclined at such at angle that interaction of female grooves 213 with males grooves 215 at angle $G_{m2}$ would result in a compression force between the male and female parts in a direction perpendicular to the assembling direction A.

FIG. 15B illustrates additional examples of male parts 228 that are configured to cooperate and operably couple with the female part 229, also shown in FIG. 15B. For example, the male parts 228 shown in FIG. 15B may be substantially similar to the male part described with respect to FIGS. 14A-H. Such a male part 228 may have a circular cross section. The male groove direction $G_m$ may thus be directed along the periphery of circular grooves wrapped around the male part 228.

FIG. 15C illustrates a further example of groove directions and part shapes for male and female joint parts. For example, FIG. 15C illustrates an example for male and female parts that are similar to those described with respect to FIGS. 12 & 13. As an example, the first furniture part 227 may comprise two male parts 228 having grooves aligned with the circumference of the male parts 228 in a male groove direction $G_m$. The second furniture part 226 may comprise two female parts 229 that are to cooperate with the two male parts 228 to assemble the furniture parts 226, 227. The furniture parts 226, 227 shown in FIG. 15C may be assembled to each other by inserting the male parts 228 in the female parts 229 at the insertion positions 211 of the female parts 229. Thereafter the first furniture part 227 may be turned with respect to the second furniture part 226 (see e.g., FIGS. 12 & 13). As furniture part 227 is turned with respect to furniture part 226, the male parts 228 may be moved along direct A until they reach end position 212.

The female grooves of the female parts 229 shown in FIG. 15C may be arranged along two female groove directions $G_{f1}$, $G_{f2}$, which may be bent or curved. The assembling direction A may thus also bent as shown in FIG. 15C. Similar to the example described with respect to FIG. 15A, the amount of space between opposing walls of the opening of the female parts 229 may decrease from the insertion position 211 to the end position 212. As a result, the amount of space available for maneuvering the male parts 228 relative to the grooves on the opposing walls of the female parts 229 may decrease as the males parts 228 are twisted from the insertion position 211 to the end position 212. During the turning process, the grooves of the male and female parts 228, 229 may interact to force furniture parts 226, 227 together to a desired assembly position due to the male parts 228 having less space available for movement between the grooves on opposite walls of the female parts 229.

Thus, like the examples where at least a portion of the opening of the female parts are tapered with a linear assembling direction, the example illustrated in FIG. 15C may force the two furniture parts 226, 227 toward each other into a desired assembling position due to the relative width of the female part opening (e.g., the distance between the female grooves on opposite walls) decreasing from the insertion position to the end position. This effect may be achieved even when the grooves of the male and female parts are not inclined with respect to each other. For example, although the assembling direction A may be bent, the two female groove directions $G_{f1}$, $G_{f2}$ may be set such that they are at acute angles (e.g., and/or severely acute angles) relative to the assembling direction A at any given location between the insertion position 211 and the end position 212. The result may be that the two furniture parts are forced together into the assembling position due to the amount of space between the male and female grooves decreasing as the width or size of the female part opening is decreased in a manner similar to that described for a tapered female part with a linear assembling direction.

Although the examples of the male and female parts 228, 229 shown in FIGS. 15A-C do not show any deformation zones, deformations zones may be provided in one or more of grooves of the male parts 228 and/or the female parts 229 of FIGS. 15A-C. For example, one or more deformation zones may be positioned such that the deformation begins just prior to the male parts 228 reach a ending position of the female parts 229. The deformation zones may be compressed as the male 228 is moved from the initial contact position of the protrusion of the deformation zone until the end position of the female parts 229 is reached.

Figure 16A:
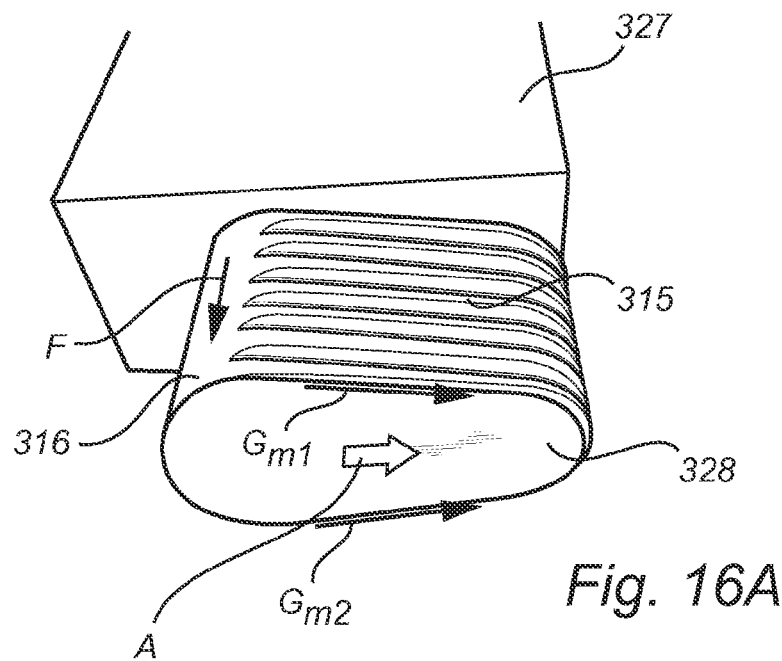
FIGS. 16A & 16B illustrate example male and female parts with grooves similar to those described with respect to FIG. 15A.

FIG. 16A illustrates a first furniture part 327 provided with a male part 328. For example, male part 328 may be substantially similar to the male parts described with respect to FIG. 15A. For example, the sides of the male part 328 may be provided with grooves 315, and the sides may taper towards each other. The grooves 315 of the male part 328 may thus be aligned along two male groove directions $G_{m1}$, $G_{m2}$. When the male part 328 is moved in the assembling direction A (e.g., the direction in which the male part is moved during assembly as illustrated in FIG. 16A) with respect to the female part 329, the interaction between male groove 315 and female grooves 313 may result in a force being applied to the male part 327 in the direction F. The male part 328 may also include non-operative surface 316, which may lack grooves. The non-operative surface 316 may correspond to a surface of the male part 328 that is not configured to interact with the female part 329. In the example shown in FIG. 16, the non-operative surface 316 may correspond to a rounded section of the male part 328 that lacks grooves 315 for interacting with the female part 329.

Figure 16B:
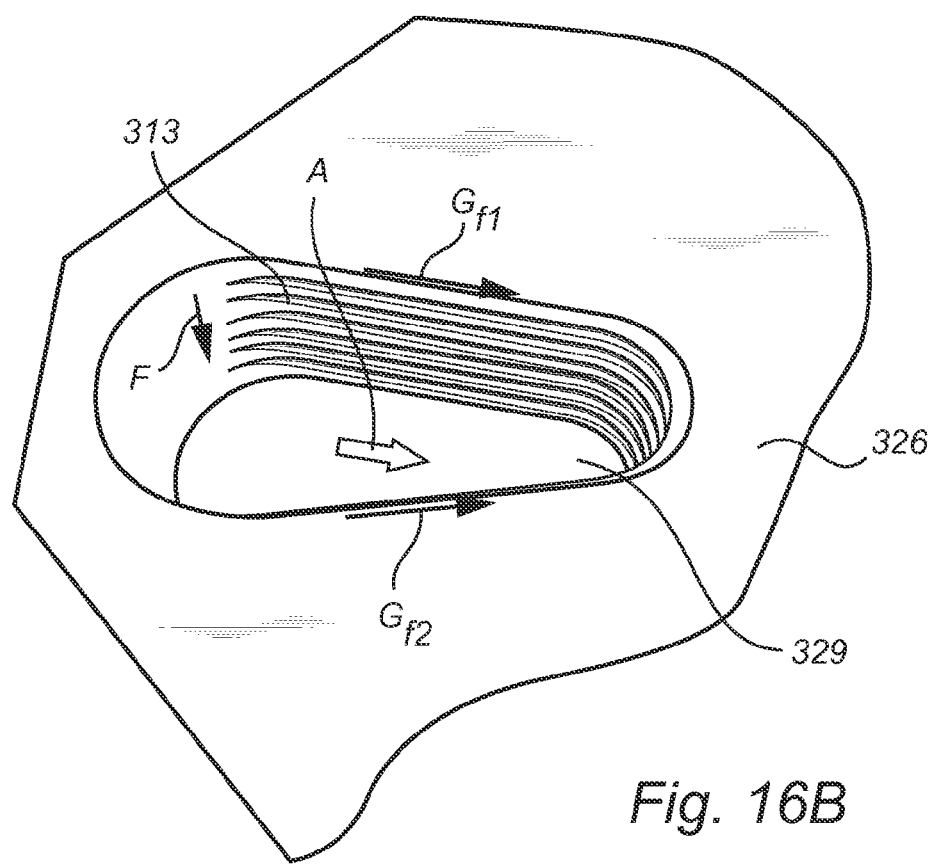

As described herein, the direction F may be the direction in which the male part 326 is forced during assembly of the furniture parts due to the interaction between male part grooves 315 and female part grooves 313 (e.g., the corresponding female parts may be described with respect to FIG. 16B). For example, the space available for the male part grooves 315 may decrease as the male part 328 is moved with respect to the female part 329 in the assembling direction A. Thus, the male part 328 will be forced in the direction F, which may be substantially perpendicular to the assembling direction A, as the space available for the male part 328 is decreased. In other words, the first furniture part 327, with the male part 328, may be forced towards the second furniture part 326, with the female part 329, in the direction F as the male part 328 is moved in the female part 329 in the assembling direction A. Such a mechanism may result in a tight fit with little space between the assembled furniture parts 327, 328 (e.g., from the perspective of the human eye).

FIG. 16B illustrates the corresponding second furniture part 326 that includes a female part 329 for interaction with the first furniture part 327 with the male part 328 illustrated in FIG. 15A above. The female part 329 may be substantially similar to the female part described with respect to FIG. 15A. Thus, the sides of the female part 329 may include grooves 313 that aligned along two female groove directions $G_{f1}$, $G_{f2}$. The assembling direction A (e.g., the direction in which the male part is moved during assembly) as well as the direction F (e.g., the direction in which the male part is forced during assembly of the furniture parts 326, 327 to each other) are also both shown in FIG. 16B.

Figure 17:
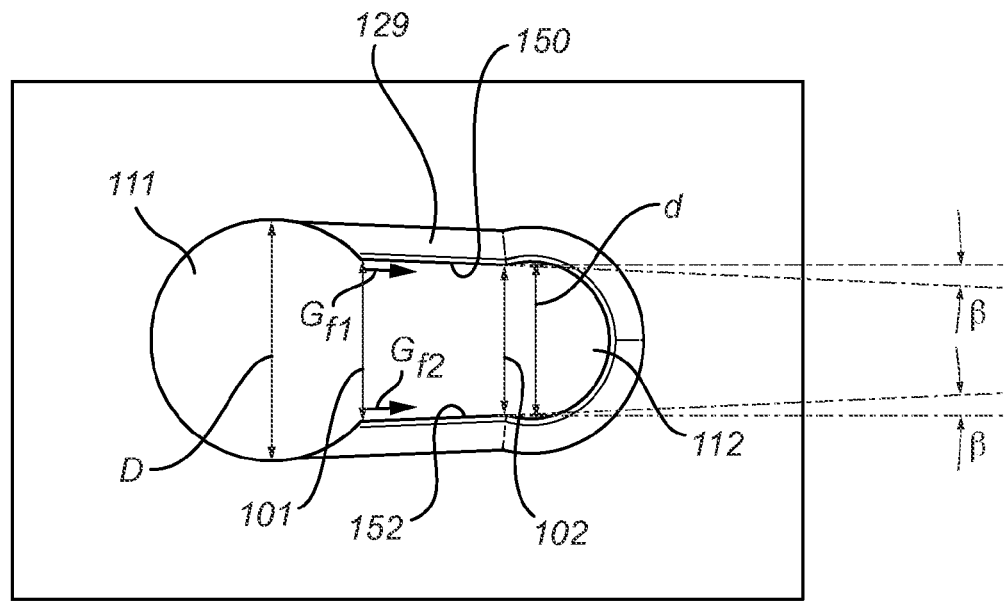
FIG. 17 illustrates an example plane view of a female part similar to those described with respect to FIGS. 14A-H.

FIG. 17 illustrates an example top plain view of the female part 129 described with respect to FIGS. 14A-H. The view shown in FIG. 17 may be substantially similar to the above plane view shown in FIG. 14D. For example, the insertion position 111 may be circular and may have a first diameter D. The end position 112 may be circular and may have a second diameter d. The first diameter D may be larger than the second diameter d. The grooves 113 of the female part 129 may be arranged along two opposite sides 150, 152 of the female part 129. The distance 154 between the opposite sides 150, 152 near the insertion position 111 may be larger than the distance 154 between the opposite sides 150, 151 near the end position 112. As a result of this tampering, the female part 129 may have a slightly triangular shape whereby the female part is wider at the insertion position 111 than towards the end position 112.

The distance between the grooves on opposite sides 150, 152 of the female part 129 at the insertion position may be referred to as insertion position groove distance 101. The distance between the grooves on opposite sides 150, 152 of the female part 129 at the end position 112 may be referred to as end position groove distance 102. The insertion position groove distance 101 may be larger than the end position groove distance 102. The insertion position groove distance 101 may be smaller than the first diameter D, and the end position groove distance 102 may be smaller than the second diameter d. By making the end position groove distance 102 smaller than the second diameter d, a clicking sound may be heard and/or a distinct interaction may be felt when the male part is moved along the female part 129 and pressed past the end position groove distance into the end position 112. To facilitate such an interaction so that the user becomes aware of when the male part passes the end position groove distance and is pressed into the end position, the distances may be set such that D>101, d>102, and D>d. In an example, D>101>d>102.

As is illustrated in FIG. 17, an angle β may be formed between a first line beginning at the center of the circular insertion position 111 and ending at the center of the circular end position 112 and a second line following the female groove direction $G_{f2}$. The angle β was also described in connection to FIG. 14 D above and may preferably be between 0.5°-5.0°, more preferably between 1.5°-3.5°, and most preferably between 2.0°-3.0°. Such angles may be considered severely acute angles.

The size of the male part 128 that should cooperate with the female part 129 shown in FIG. 17 may be made slightly smaller than the insertion position groove distance 101. Thereby the male part 129 may be easily moved along the grooves 113 of the female part 129 from the insertion position 111 towards the end position 112. Moreover, the size of the male part 128 may be made slightly larger than the end position groove distance 102 to obtain a distinct end position for the male part 128 at the female part 129. In other words, in the male part 129 may be forced pass the narrower end position groove distance 102, as was also described in connection to FIG. 14F above. The size of the male part may refer to the diameter of the male part at the position where the male part will be forced to pass end position groove distance 102 (e.g., the diameter of the male part if the male part has a circular cross section).

Figure 18:
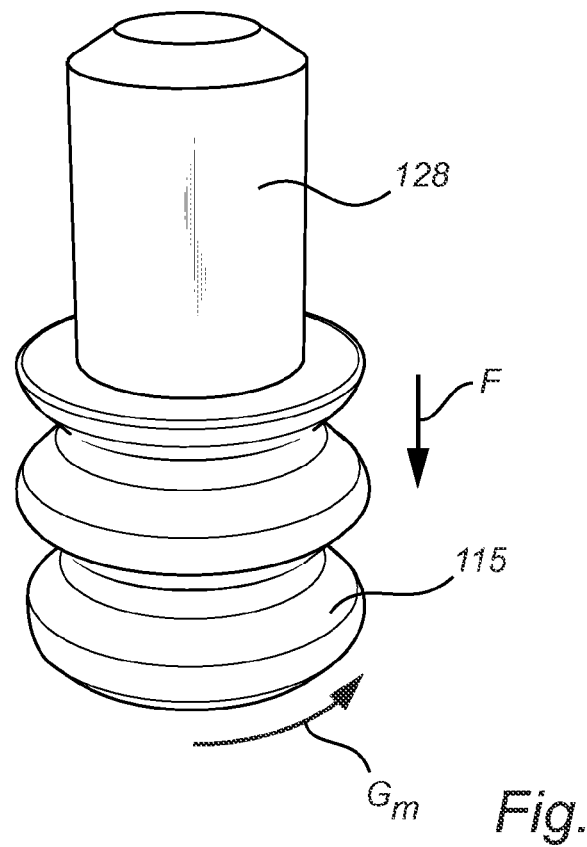
FIG. 18 illustrates an example of a male part.

FIG. 18 illustrates an example male part 128 for interacting with female part 129 of FIG. 17. For example, the male part 128 may include grooves 115 in circular groove direction $G_m$. The grooves may be operably coupled to interact with corresponding grooves on female part 129 such that as the male part 128 moves from an insertion position 111 to an end position 112, the male part 128 is forced in direction F closer to the furniture part including female part 129. Although not shown in FIG. 18, a deformation zone may be included on one of more of the grooves 115 of the male part 128. Additionally, the male part 128 is shown to have a circular cross section in FIG. 18, the male part 128 may include one or more non-operative portions that do not include grooves 115 and do not interact with the female part 129 in order to affix the furniture parts together (See e.g., FIG. 16B, 16A, etc.). As shown in FIG. 18, the male part 128 may be a separate portion that is installed in a furniture part to be coupled to another furniture part that includes a female part 129.

The number of grooves of the male and female part may vary but normally at least two grooves are arranged at respective part. The number of co-operating grooves of the male and female parts influences the strength of the joint. The more grooves the stronger the joint will be.

The male part has a flange at an outer free end in some embodiments. The female part is formed to receive the flange of the mail part to guarantee that the male part cannot be moved along the female part until the male part is at the bottom of the female part.

The furniture parts may be parts of different types of furniture, such as tables, chairs, cupboards, shelves and may include different appliances, such as hinges and door knobs. The furniture parts as well as the male and female parts may be made of many different materials, such as wood, fibre or chip boards, plastic and metal. Co-operating female and male parts may be made of different materials, but the material of one of the parts should be soft and normally softer than the material of the other part.

The male and female parts of the present invention may be used with furniture parts of different thickness. It has shown that the joints function well for furniture parts having a thickness of at least 10 mm. However, it is likely that the joints would also function with furniture parts thinner than 10 mm.

The number of co-operating male and female parts varies depending for instance on the furniture parts to be assembled.

The invention claimed is:

1. A furniture joint comprising:
a female part included in a first furniture part, the female part configured to accept a male part included in a second furniture part at an insertion position of the female part, the female part comprising first grooves having a planar ramped portion at a first groove inclination angle relative to a plane that extends perpendicularly from a side wall of the female part, the first grooves being configured to interact with second grooves included on the male part that also have a planar ramped portion that are of a second groove inclination angle, the first groove inclination angle being complementary to the second groove inclination angle, wherein an opening of the female part is tapered such that a first groove width across the opening of the female part near or substantially adjacent to the insertion position is wider than a second groove width across the opening of the female part near or substantially adjacent to an end position; and
the male part included in the second furniture part, wherein the male part comprises the second grooves that are configured to interact with the first grooves of the female part as the male part is moved from the insertion position of the female part to the end position of the female part, wherein the interaction of the first and second grooves results in the male part being forced towards the female part to a desired assembly position.

2. The furniture joint as in claim 1, wherein the interaction of the first and second grooves results in the male part being forced towards the female part in a direction substantially perpendicular to an assembling direction traversed by the male part.

3. The furniture joint as in claim 1, wherein an amount of relative space available for movement between the male part and the female part is decreased as the male part is moved from the insertion position to the end position.

4. The furniture joint as in claim 3, wherein the tapering of the female part ends prior to the end position, and the width of the end position is wider than a width of the opening at the end of the tapering.

5. The furniture joint as in claim 1, wherein one or more of the first grooves of the female part or the second grooves of the male part comprise a deformation zone, and the deformation zone corresponds to one or more protrusions from the surface of one or more of the first grooves or the second grooves.

6. The furniture joint as in claim 5, wherein the movement of the male part from the insertion position to the end position results in the one or more protrusions of the deformation zone being compressed.

7. The furniture joint as in claim 1, wherein the first grooves and the second grooves are comprised of material with substantially the same hardness.

8. The furniture joint as in claim 1, wherein the grooves of the female part and the grooves of the male part are comprised of materials with different hardness.

9. The furniture joint as in claim 1, wherein two female part groove directions of the first grooves of the female part are at an acute angle relative to an assembling direction traversed by the male part.

10. The furniture joint as in claim 9, wherein the first groove width is less than a width of the opening of the female part at the insertion position, and the second groove width is greater than the width of the opening of the female part at the end position.

11. The furniture joint as in claim 10, wherein a width of the male part is less than the second groove width.

12. The furniture joint as in claim 11, wherein movement of the male part along the assembling direction past a position corresponding to the second groove width and into the end position results in an audible indication that the male part has reached the desired end position.

13. The furniture joint as in claim 9, wherein the acute angle of the first grooves of the female part relative to the assembling direction corresponds to a severely acute angle at or between 2-3°.

14. The furniture joint as in claim 9, wherein each of the two female part groove directions and the assembling direction are bent or curved.

15. The furniture joint as in claim 1, wherein the plane that extends perpendicularly from the side wall of the female part includes a line defined by movement of the male part from the insertion position of the female part to the end position of the female part.

16. The furniture joint as in claim 1, wherein each of the first and second groove inclination angles are approximately 45°.

* * * * *